March 21, 1950  E. R. DOAK ET AL  2,501,035
TOY AUTOMOBILE
Filed May 19, 1947

Inventors
Edmond R. Doak
Nelson E. Grace

By Lyon & Lyon
Attorneys

Patented Mar. 21, 1950

2,501,035

UNITED STATES PATENT OFFICE 2,501,035

TOY AUTOMOBILE

Edmond R. Doak and Nelson E. Grace, Los Angeles, Calif., assignors to Doak Aircraft Co., Inc., Torrance, Calif., a corporation of California Application May 19, 1947, Serial No. 748,942

4 Claims. (Cl. 280—259)

The present invention relates to a toy automobile.

An object of the present invention is to provide an improved toy automobile characterized by its ruggedness and simplicity of construction.

Another specific object of the present invention is to provide an improved toy automobile of streamlined appearance with a relatively wide front and a relatively narrow tail resembling a teardrop, the particular steering and propelling mechanism for the same being an important feature of the present invention.

Still, another object of the present invention is to provide an improved toy automobile having as one of its features a new mounting for the bumper thereof.

Yet another specific object of the present invention is to provide an improved toy automobile which may be made relatively inexpensively and capable of using present day mass production methods in its fabrication.

Yet another object of the present invention is to provide an improved toy automobile having a pair of front drive wheels and a single rear wheel which may be controlled in a novel manner to steer the automobile.

Still a further object of the present invention is to provide an improved toy automobile including novel means whereby the wheel axles may be supported within a streamlined shell forming the body of the automobile.

Still a further object of the present invention is to provide an improved automobile in which the component elements thereof may be quickly and conveniently assembled thereon.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
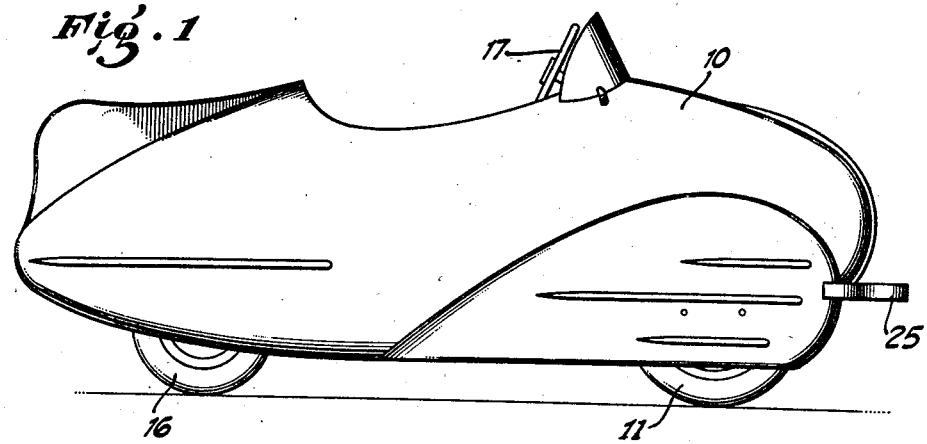
Figure 1 is a view in side elevation of a toy automobile embodying the present invention.
Figure 2:
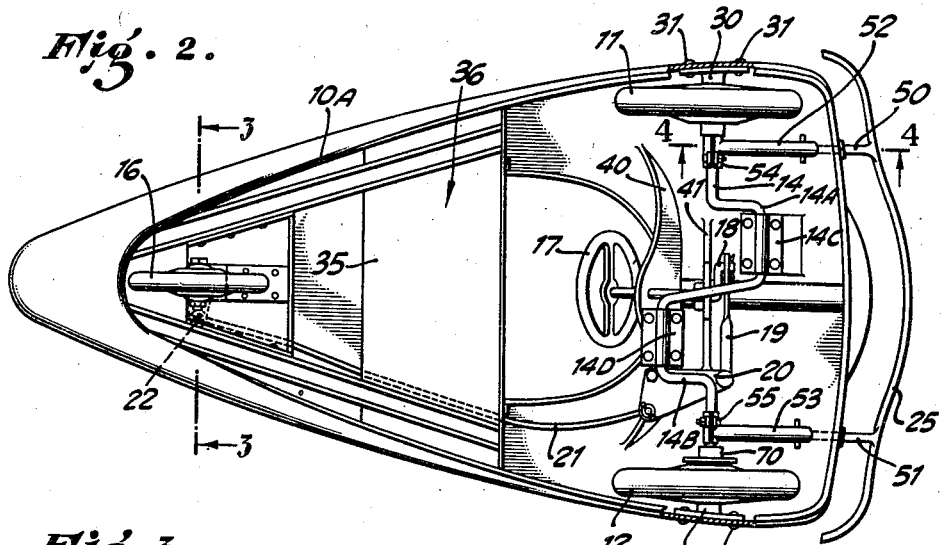
Figure 2 is a plan view showing the underside of the automobile in Figure 1, and with a portion thereof broken away to show one of the front axle bearing structures.
Figures 3, 4:
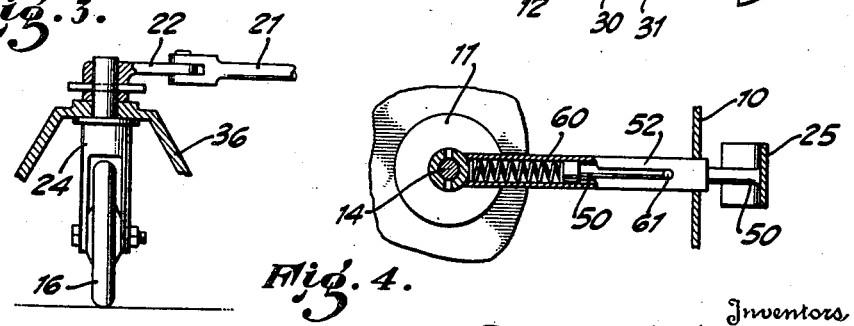

Figures 3 and 4 are sectional views taken substantially and respectively on the line 3—3 and 4—4 of Figure 2.

The toy automobile shown herein includes a streamlined shell member 10 which serves both as the body and the frame; a pair of front wheels 11 and 12 which are mounted for rotation on the pedal shaft 14; a steerable rear wheel 16 which can be oriented for steering purposes by movement of the steering wheel 17 through the mechanism comprising in turn crank arm 18, rod 19, pivoted lever member 20, actuating rod 21, crank arm 22 and rotatable wheel support 24; and, also a front bumper 25 which is supported both on the pedal shaft 14 and the body 10.

The automobile shown and described herein is essentially the same as the one shown in our Design Patent 146,465, patented March 18, 1947.

The automobile body and frame member 10 is preferably formed of two half stampings of sheet metal which are then riveted or welded together along a line extending centrally and longitudinally of the automobile to form a streamlined outer shell. This outer shell serves both as the body and also as the frame.

The axle 14 bent to form a pair of crank members 14A and 14B has its ends journaled for rotation in a pair of respective bearing members 30 which are fastened by screws or bolts 31 to the frame 10. The crank members 14A and 14B have each mounted thereon a convenient footrest 14C and 14D, respectively, for engagement with and propulsion by the driver of the automobile who may conveniently sit on the seat 35 provided by the subframe 36, the foot pedals 14C and 14D being pivotally mounted on the cranks 14A and 14B.

The rear wheel 16 mounted for rotation in the wheel holder 24 is mounted for movement as a unit to provide steering by journaling the wheel holder 24 in the subrear portion of the subframe 36, the subframe 36 being, of course, fastened to the shell 10 along, for example, the bottom arcuate shaped flange 10A. The upper end of the wheel holder 24 has a crank arm 22 which is pin connected to the actuating rod 21.

It is noted that the subframe 36 may be fabricated as a unit and then slipped through the bottom opening of the shell 10 into position where the corresponding arcuate shaped adjacent abutting edges of the subframe 36 and shell 10 may be fastened together by bolts, welding, and the like, the particular triangular configuration of the subframe and the opening in the bottom of the automobile conveniently allowing this expedient.

This subframe, of course, comprises the seat 35 and the support for the wheel holder 24 which is pivotally mounted thereon. The steering wheel 17 which serves to orient the direction of the plane of the wheel 16 is journaled for rotation at two points, respectively, on the rib members 40 and 41 each mounted on the inner surface of the shell 10. Rotational movement of the steering wheel 17 thus causes angular movement of the crank 18 and substantially longitudinal movement of the rod 19 to rotate the lever member 20 and to correspondingly move the actuating rod 21 and the crank member 22, the lever member 20 being pin connected to an extension of the stationary rib member 40.

The pumper 25 has a pair of spaced parallel rods 50 and 51 attached thereto, each of which are mounted for spring biased telescopic movement in the outer cooperating telescopic members 52 and 53, respectively.

These outer telescopic members 52 and 53 each have one of their ends mounted on the axle 14 and the other one of their ends mounted on the front portion of the shell 10 at spaced points thereon. The connection between members 52 and 53 and the axle 14 being through bearing members 54 and 55, respectively, allow free rotational movement of the axle 14. A compression spring 60 in each one of the outer telescopic members 52 and 53 normally biases the bumper 25 away from the shell 10 to the position corresponding to the engagement of the stop member 61 with the slotted portion of the tube 52. The stop member 61 may comprise a cotter pin or the like which serves also to facilitate the assembly of the composite bumper structure.

Thus, the bumper rods 50 and 51 extend through the shell 10 and are capable of sliding movement in the members 52, 53, the bumper being yieldably urged outwardly by means of the springs 60 within the tubular rods 52, 53.

While the wheel 11 is keyed to the shaft or axle 14 for rotation therewith the other wheel 12 is mounted by means of the interposed bearing member 70 for independent rotational movement with respect to the axle of shaft 14 in order to provide a differential action, whereby the automobile may be conveniently and easily steered around corners.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A toy automobile comprising a pedal crank shaft, a shell member comprising the body portion of said automobile, a pair of bearing members mounted on and in the interior of said shell and supporting the crank shaft for rotation, a bumper extending through said shell member, and bearing members attaching said bumper to said axle.

2. In a toy automobile comprising a front pedal crank shaft, a shell comprising the body portion of said automobile, a bumper passing through said shell and partially supported thereby at the place where it passes through said shell, bearing means arranged to attach said bumper to said crank shaft, a pair of spaced bearing members mounted on the interior of said shell and arranged to support said crank shaft.

3. In a toy automobile having but a single rear steerable wheel, a shell member having a triangular opening in the bottom thereof with the apex thereof at the rear of said automobile, a triangular subframe arranged for insertion and fastening engagement with the edges of said triangular portions abutting, said subframe comprising a seat for the driver of the automobile and a hanger for the singular rear wheel of the automobile, a front pedal axle, a bumper passing through said shell member and partially supported thereby at the place where it passes through said shell member, and bearing members attaching said bumper to said pedal axle.

4. In a toy automobile having but a single rear steerable wheel, a steering wheel for said automobile at the forward portion thereof, a frame member for said automobile, said steering wheel being rotatably mounted on said frame member and having a crank member thereof, a pivoted lever member on said frame, said rear wheel being mounted on a wheel carrier, said wheel carrier being attached to a crank arm, and actuating rods connecting said steering wheel crank to said lever member, and an actuating rod connecting said pivoted lever member to the crank on the wheel carrier, a pedal axle, a streamlined outer shell attached to said frame member, a bumper passing through said shell and partially supported thereby at the place where it passes through said shell, and bearing members attaching said bumper to said pedal axle.

EDMOND R. DOAK.
NELSON E. GRACE.

REFERENCES CITED

The following references are of record in the file of this patent:

UNITED STATES PATENTS

| Number | Name | Date |
|---|---|---|
| 950,045 | Hart | Feb. 22, 1910 |
| 1,754,430 | Kraeft | Apr. 15, 1930 |
| 1,778,143 | Carlson | Oct. 14, 1930 |
| 2,034,824 | Nelson | Mar. 24, 1936 |
| 2,080,922 | Kraeft | May 18, 1937 |

FOREIGN PATENTS

| Number | Country | Date |
|---|---|---|
| 13,234 | Great Britain | June 4, 1912 |